UNITED STATES PATENT OFFICE.

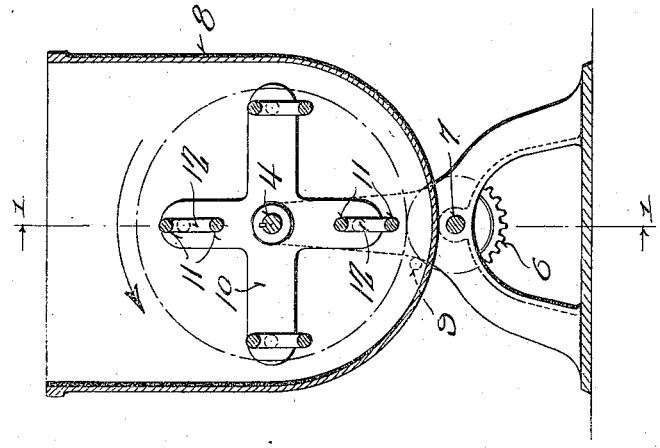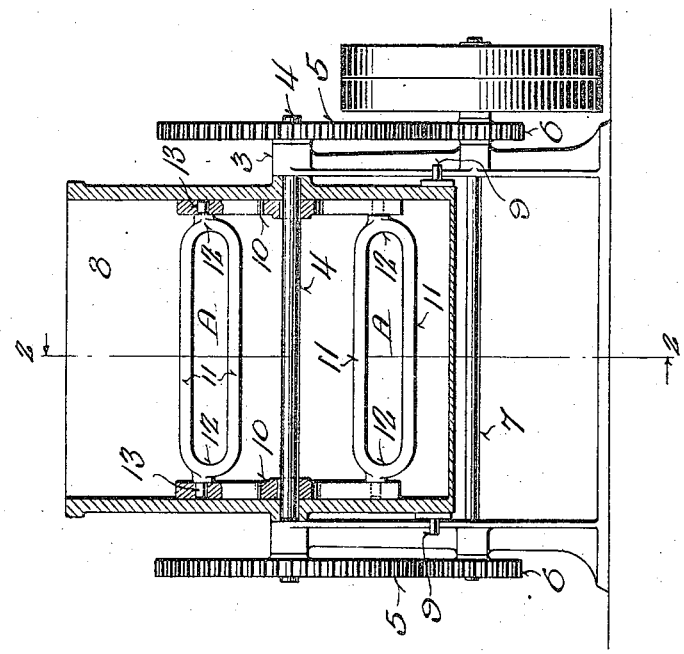

MIKE J. PODZEAMSKI, OF MILWAUKEE, WISCONSIN.

DOUGH-MIXING MACHINE.

1,214,585.  Specification of Letters Patent.  Patented Feb. 6, 1917.

Application filed April 3, 1916. Serial No. 88,449.

*To all whom it may concern:*

Be it known that I, MIKE J. PODZEAMSKI, a subject of the Czar of Russia, and resident of Milwaukee, in the county of Milwaukee and State of Wisconsin, have invented certain new and useful Improvements in Dough-Mixing Machines; and I do hereby declare that the following is a full, clear, and exact description thereof.

My invention refers to dough mixers and has for its primary object to provide a simple, effective and economical machine of the character described, the specific object being to provide arms in the form of loops for the agitator mechanism, the same being loosely trunnioned in the heads of the agitator, whereby a uniform position is maintained to present their wide faces to the dough in the working operation.

With the above objects in view the invention consists in certain peculiarities of construction and combination of parts as hereinafter set forth with reference to the accompanying drawings and subsequently claimed.

In the drawings Figure 1 represents a sectional elevation of a machine embodying the features of my invention, the section being indicated by line 1—1 of Fig. 2, and Fig. 2, a cross-section of the same, the section being indicated by line 2—2 of Fig. 1.

Referring by characters to the drawings, 3 represents standards of a skeleton frame in which are journaled a shaft 4 having secured to its ends gear-wheels 5, 5, that mesh with companion pinions 6, which pinions are fast upon a drive shaft 7 that is also journaled in the frame standards. The drive shaft is provided with a suitable tight and loose pulley whereby motion is imparted to the mechanism. Loosely mounted upon the shaft 4 is a hopper 8 having a semi-circular bottom which is positioned concentrically with relation to the axis of the shaft 4. This hopper is arranged to be tilted for dumping purposes in one direction and is held in its upright position as shown in Fig. 2 by pins 9 that project from the end walls of the hopper and engage the frame standards. Hence when the dough agitator is operated in the direction as indicated by the arrow the pins engage the standards and prevent tilting of the hopper in the direction of rotation of the agitator.

The dough agitator or reel comprises a pair of heads 10 that are fast upon the shaft 4, which heads are connected by beaters A, each of the same being in the form of arms 11 that are spaced apart and connected by loops 12 at their ends. The looped ends of the beaters have trunnions 13 projecting therefrom which are loosely mounted in bearings with which the heads 10 are provided. Attention is called to the fact that these trunnions are positioned to one side of an imaginary central line with relation to the parallel arms 11. Hence the beater arms by gravity will assume a vertical position at all times when the reel is revolved to present flat surfaces to oppose the dough, whereby it is thoroughly worked. By arranging the trunnions off center it will also be observed that when the beaters squeeze the dough between the side wall of the hopper the pressure upon the beater arm farthest from the trunnion will serve as a leverage to squeeze the opposite or short leverage beater arm against the dough. The looped arms also permit the dough to be squeezed therebetween into folds as the reel is operated and thus thoroughly work the same in a manner somewhat similar to a hand operation.

I claim:

1. A dough mixing machine comprising a container, a rotatable carrying member, an agitator member in the container journally carried by said rotatable member, and the center of gravity of said agitator member being disposed laterally of its rotative axis whereby upon rotation of the carrying member, said agitator member will be imparted independent rotative movement upon engagement with work material.

2. A dough mixing machine comprising a container, rotatable members at the sides of the container, agitator loops and pintles at the ends of the loops journaled in said rotatable members, said pintles being disposed laterally of the axes of said loops.

In testimony that I claim the foregoing I have hereunto set my hand at Milwaukee, in the county of Milwaukee and State of Wisconsin, in the presence of two witnesses.

MIKE J. PODZEAMSKI.

Witnesses:
FRANK S. RATCLIFFE,
M. E. DOWNEY.